United States Patent Office 3,536,282
Patented Oct. 27, 1970

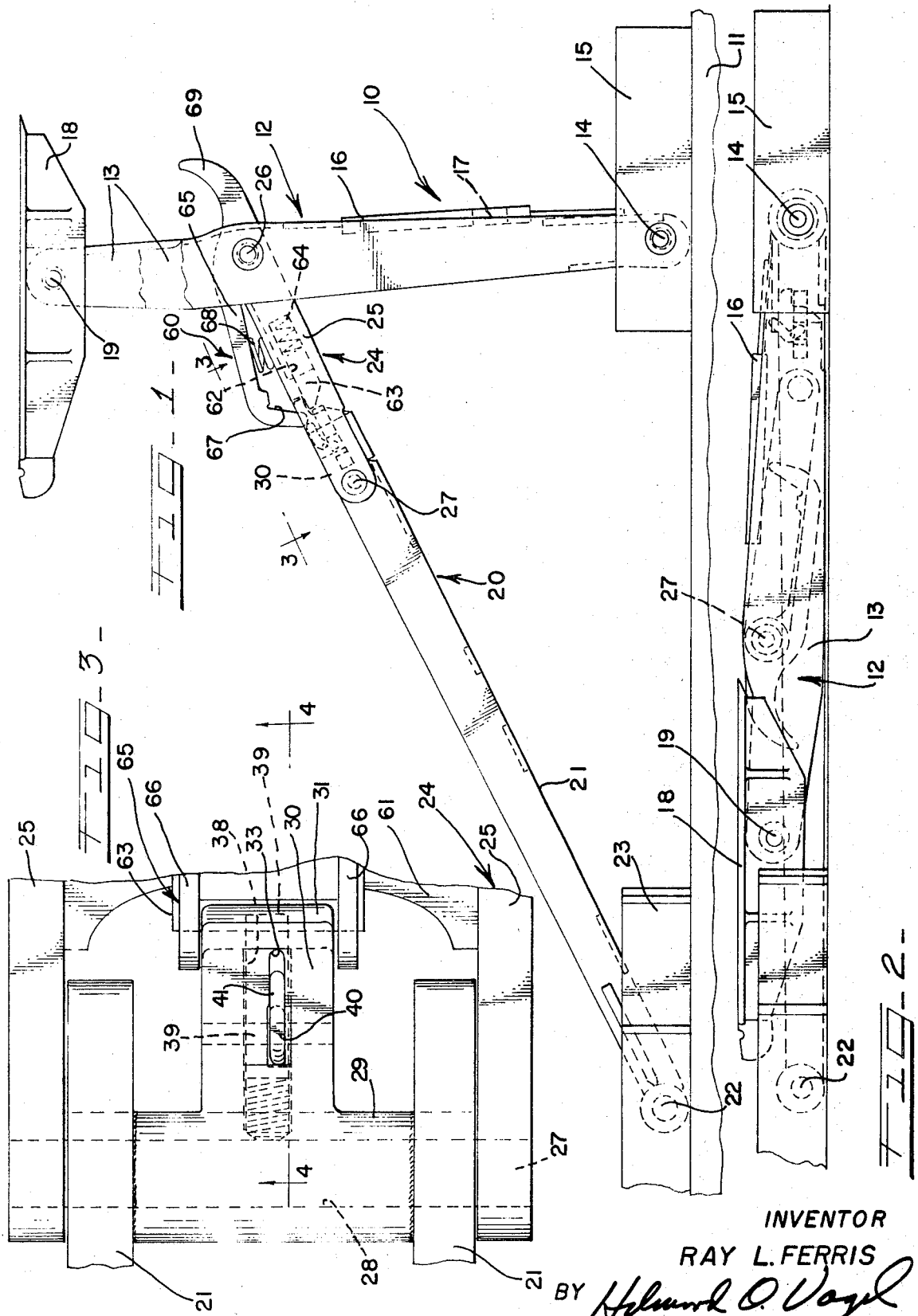

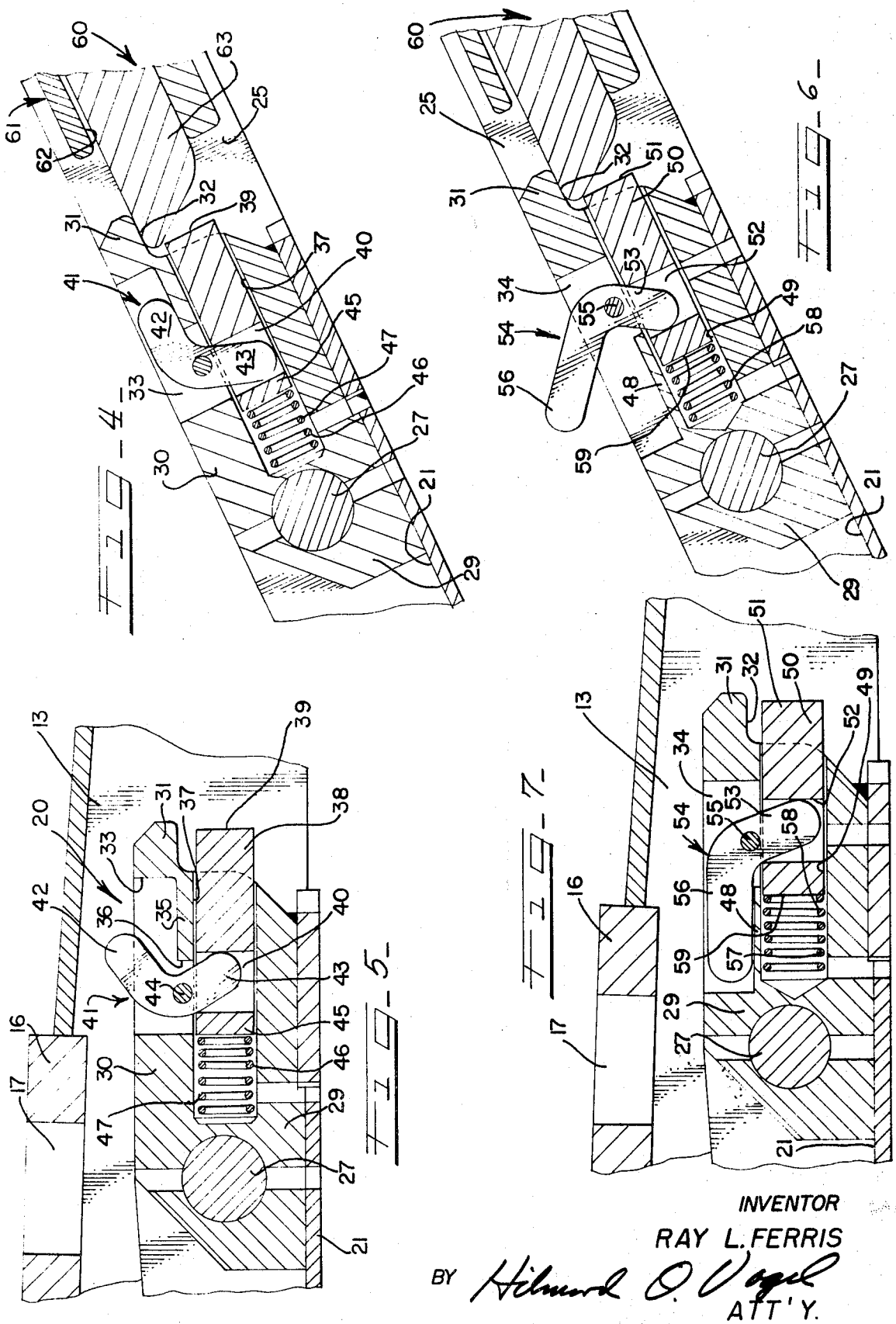

3,536,282
LOCK INDICATOR FOR FIFTH WHEEL TRAILER HITCH
Ray L. Ferris, Thornton, Ill., assignor to Pullman Incorporated, Chicago, Ill., a corporation of Delaware
Filed Nov. 13, 1967, Ser. No. 682,297
Int. Cl. B65j 1/22
U.S. Cl. 248—119                                3 Claims

ABSTRACT OF THE DISCLOSURE

A trailer hitch for supporting a wheeled trailer on a flat car with said hitch including a vertical strut having a fifth wheel plate supported thereon for connection to the kingpin of the trailer, the said upright strut being supported in its vertical position by means of a collapsible diagonally extending strut pivotally connected to a cushion supported on the flat deck of a railway car. The diagonal strut consists of upper and lower strut elements pivotally connected together in a linear or operative position by means of a latch mechanism which is provided with a disconnectable latch element associated with a lock indicator which in one position of the latch mechanism projects outwardly from the diagonal strut to indicate to an operator said position.

BACKGROUND OF THE INVENTION

Field of the invention

This invention relates to the field of trailer-on-flat-car operation (TOFC) wherein the trailer is supported on its wheels at its rear end on the flat deck of the car and its fifth wheel kingpin engages a fifth wheel plate supported on a trailer hitch also referred to as a fifth wheel stanchion.

Description of the prior art

The present invention relates to the foldable type of stanchion disclosed in the Ferris Pat. 3,185,421. In stanchions of the folding type an upright support is generally provided for the fifth wheel plate which is adapted to receive in engagement the kingpin of a trailer. The upright stanchion includes a diagonal strut having a pair of upper and lower strut elements pivotally connected together which in a linear position support the upright strut in its supporting position and which in a collapsed provided for collapse of the trailer hitch onto the deck of a flat car into a non-use position. To maintain the upper and lower strut in the linear operable position a latch mechanism is provided which securely locks the struts in this position. As shown in the aforementioned patent, the latch mechanism may be actuated to lower the trailer hitch to its collapsed position by the application of a longitudinal force which provides for the collapsing movement of the trailer hitch. The latching mechanism used in connection with the present invention is particularly described in the Wille and Ferris application Ser. No. 543,991 filed Apr. 20, 1966 now U.S. Pat. No. 3,358,955 issued on Dec. 19, 1967. The prior art patents of the type of trailer hitch to which the present invention applies disclose various latching mechanisms. The present invention is concerned with a lock-indicating device which cooperates with the latching mechanism to clearly indicate to the operator that the latching mechanism is properly locked in position for supporting the upper and lower struts in their linear or supporting position.

SUMMARY

The present invention is concerned with the provision of a lock-indicating device which cooperates with a latching mechanism to indicate to the operator that the latching mechanism is effective to retain the diagonal strut of a trailer hitch in a supporting position. Since the type of trailer hitch to which the present invention applies is raised, from a collapsed position, by means of a tractor to a raised position wherein the latching mechanism is automatically operable to cooperate with the upper and lower struts of a diagonal strut for locking the same in a linear position, the present lock indicator indicates to the operator that the latching mechanism has satisfactorily completed its locking engagement and thus provides assurance that the trailer hitch is secured against accidental collapse during train operation.

BRIEF DESCRIPTION OF THE DRAWINGS

FIG. 1 is a side elevational view of a trailer hitch in an operative or upright position on a flat car ready for supporting a trailer in position;

FIG. 2 is the trailer hitch disclosed in FIG. 1 shown in a collapsed or inoperative position;

FIG. 3 is an enlarged plan view taken substantially along the line 3—3 of FIG. 1;

FIG. 4 is an enlarged cross sectional view of a lock indicator and latching mechanism taken substantially along the line 4—4 of FIG. 3;

FIG. 5 is a cross sectional view similar to FIG. 4 showing the position of a lock indicator in a collapsed position;

FIG. 6 is a modified view similar to FIG. 4 showing a cross section of a lock-indicating mechanism and latch mechanism; and FIG. 7 is a cross sectional view similar to FIG. 6 showing the lock indicator and latching mechanism in a collapsed position.

DESCRIPTION OF PREFERRED EMBODIMENT

A preferred embodiment of the present invention is disclosed in FIGS. 1 through 5 wherein a trailer hitch or stanchion is generally referred to by the reference character 10. The trailer hitch 10 comprises a base 11 which generally is formed by the deck of a railway car. The trailer hitch 10 comprises a vertical strut 12 including a pair of vertically extending laterally spaced strut members 13 which are pivotally connected to the deck of the car 11 by means of a pivotal connection 14 with a bracket 15 supported on said deck.

The vertical strut members 13 are suitably connected by means of a vertically extending plate 16 having an opening 17 therethrough. The plate 16 permits raising of the vertical strut members 13 to their raised position by means of a hook which engages the opening 17 so that a tractor carrying said hook upon rolling movement can raise the trailer hitch 10 to the operative position. This operation is conventional in TOFC loadings wherein the operator of the tractor merely manipulates a hook into engagement with the opening 17 as the hitch 10 is lying in a position shown in FIG. 2 and where upon movement of the tractor the same is lifted to its raised and operative position.

The vertical strut members 13 also support at their upper ends a fifth wheel plate 18 which is pivotally connected as indicated at 19 to the vertical strut 12.

In order to maintain the vertical strut 12 in its upright position a diagonally extending strut 20 is provided. The diagonal strut 20 comprises a pair of transversely spaced lower strut elements 21 which are pivotally connected as indicated at 22 to a bracket 23 which is suitably connected to a cushion on the deck 11 of the railway car. The lower strut elements 21 are connected to an upper strut 24 comprising a pair of laterally spaced upper strut elements 25. The pivot connection of the upper and lower strut elements is by means of a suitable pivot 27. The upper strut elements 25 are also pivotally connected to the strut members 13 by means of a pivot pin indicated at 26 which is supported on strut members 13.

The pivotal connection of the strut elements 21 and 25 is best shown in FIG. 3 wherein it is shown that the pivot pin 27 extends through the strut elements 21 and through a bore 28 provided in a transversely extending T-shaped bracket 29 rigidly welded to the upper ends of the lower strut elements 21. The T-shaped bracket 29 comprises a projecting portion 30, which as best shown in FIGS. 3 through 7, is provided at its forward ends with a keeper 31 having a suitable undercut portion 32. The projecting portion 30 also is provided, as shown in FIGS. 3, 4 and 5, with a slot or recess 33 and as shown in FIGS. 6 and 7 with a slot or recess 34.

Referring now particularly to FIGS. 3, 4 and 5, the preferred embodiment shows the projecting portion 30 provided with a horizontally extending wall element 35 having a slot 36 provided therein. The slot 36 is in communication with a recess 37 in which an actuating element 38 is slidingly disposed. The actuating element 38 comprises a front face 39 and includes a slot 40. An L-shaped indicator element 41 includes finger elements 42 and 43 the said indicator element being mounted for pivotal movement on a pin 44 supported within the recess 33. The finger 43 is in projecting engagement with the slot 40 and upon sliding movement of the actuating element 38 is movable from the position indicated in FIG. 4 to the position of FIG. 5.

The actuating element 38 also includes a rear wall 45 movable into an end portion 46 of the recess 37. The end portion 46 holds captive a spring 47 which is urged against the rear face 45 of the actuating element 38 to normally urge the same into the position shown in FIG. 5.

Referring now to FIGS. 6 and 7, the projecting portion 30 containing the recess 34 is also provided with a wall 48 being suitably apertured to provide communication with a recess 49. The recess 49, similar to the embodiment shown in FIGS. 4 and 5, includes for sliding movement an actuating element 50. The actuating element 50 includes a front face 51 and is provided with a slot or aperture 52 which is engaged by a finger 53 of an L-shaped indicator element 54. The element 54 is also pivotally connected within the recess 34 by means of a pivot pin 55 and the indicator element 54 includes an indicating finger 56. The recess 49 is provided with an end portion 57 which holds captive a spring 58 being urged against the rear wall portion 59 of the actuating element 50 to urge the same into the position shown in FIG. 7.

Both the preferred embodiment shown in FIGS. 1 through 5, and the modification of FIGS. 6 and 7 include a latch mechanism 60 which is generally described and is also described in more detail in the aforementioned co-pending application Ser. No. 543,991, now Pat. No. 3,358,955.

The latch mechanism 60 comprises a transverse wall 61 suitably supported between the upper strut elements 25 as indicated in FIG. 3 The wall 61 includes a recess 62 which contains for sliding movement a latch element 63. A spring 64 disposed in the recess 62 normally urges the latch element 63 in the direction of the keeper 31 where in the position as shown in FIGS. 4 and 6, the said latch element 63 is in engagement with the undercut surface 32 of the keeper 31 thereby retaining the upper and lower diagonal strut elements 21 and 25 in a linear or supporting position relative to the vertical strut 12. The latch mechanism 60 also includes a pivoted hook arm 65 having a pair of transversely spaced hook arms 66 which are provided at their ends with hook shaped portions 67. The hook arm 65 is normally urged in the position shown in FIG. 1 by means of the spring 68 wherein it is out of engagement with the latch 63. The hook arm 65 also includes a thrust engaging projection 69. The hook arm 65 is pivoted about the pivot pin 27 as will be disclosed in the operation which follows.

THE OPERATION

The operation of the trailer hitch 10 will now be generally described. As indicated previously, the strut 12 is pulled to its upright position shown in FIG. 1 by means of a tractor having a suitable hook arrangement engageable with the plate 16. Upon pulling the hitch 10 from its collapsed position shown in FIG. 2 to the upright position, the pivotal strut elements 21 and 25 are moved to the linear position indicated in FIGS. 1, 4 and 6. Since the latch element 63 is continually urged in the direction of the keeper 31 upon the assumption of the strut elements 21 and 25 of their linear position, the latch element 63 is in engagement with the undercut surface 32 as shown in FIGS. 4 and 6, thereby retaining the elements in linear relation. To collapse the stanchion to its collapsed position, the tractor provides a longitudinal blow against the element 69 causing the rotation of the arm 65 whereupon the hook portion 67 causes retraction of the latch element 63 into its recess 62 whereupon it becomes disengaged from the keeper 31 and the strut elements 21 and 25 jackknife to permit collapse of the trailer hitch.

The invention of the preferred embodiment of FIGS. 4 and 5 shows that in the collapsed position of the trailer hitch the actuating element 38 has been moved outwardly from the recess 37 by means of the spring 47 in turn causing rotation of the L-shaped indicator element 41 from a recessed position to the position shown in FIG. 5 wherein the finger 42 projects outwardly indicating that the latch mechanism 60 is not in a locked position. After the strut elements 21 and 25 have been moved to the supporting locked position shown in FIG. 4, the latch element 63 in its engagement with the keeper 31 has pushed the actuating element 38 to the position indicated whereupon the finger 42 has moved to a recessed position within the recess 33 and thus, since there is no projection of the indicator element 41 out of the recess 33, the operator knows that the strut elements 21 and 25 are properly locked in the linear position. Even in the upright operative position of the hitch, any projection of the finger 42 outwardly of the recess 33 would indicate to the operator that the latch mechanism 63 has not moved to its completely locked position.

The modified version shown in FIGS. 6 and 7 provide similar locking indication. However, in this particular arrangement projection of the L-shaped locking element 54 from the recess 34 indicates that the latching element 63 has moved to its perfectly locked position whereas if the finger 56 is in a recessed or partially recessed position relative to the recess 34, the operator knows that the latch member 63 has not completely moved to its locking position. In other words, in FIG. 7 the indicator element 54 is completely recessed which, of course, is the position which indicates the unlocked position of the latch mechanism. In FIG. 6 the actuating element has been shoved rearwardly against the spring 58 by means of the latch element 63 moving into its locked position relative to the keeper 31. Thus, the projection of the indicating finger 56 outwardly of the recess 34 indicates that the complete locking function has been obtained. By means of the preferred embodiment and the modification of the locking indicating arrangement, the operator by visual observation is assured at all times that the trailer hitch 10 is in the proper position for over-the-road operation and support of a trailer. By merely glancing at the locking indicator he is able to determine that effective locking function of the latch has been achieved so that there is no possibility of the said latch becoming unlocked during over-the-line operation.

Thus, it is apparent that the advantages, function and structure of the invention have been fully disclosed, that it must be understood the changes in modifications may be made therein without departing from the spirit of the invention nor the scope thereof as defined in the appended claims.

What is claimed is:

1. In a trailer hitch having a first strut adapted to be pivotally connected to a railway car for movement from an upright position to a collapsed position, a connecting plate supported by said first strut for attachment to the kingpin of a trailer, a second strut extending diagonally relative to said first strut, said second strut including a first strut element pivotally connected to a railway car, a second strut element pivotally connected to said first strut and to said first strut element, said strut elements in a linear position supporting said first strut and being pivotal in jackknife relation during movement of said first strut to its collapsed position, latching means including a movable latch element on said second strut element, a keeper on said first strut element engaged by said movable latch element to a connected position for retaining said strut elements in said linear position, and means supported on said struts movable upon the application of a longitudinal force for disconnecting said latch element from said keeper to collapse said hitch;

a latch position-indicator arrangement comprising:
  a first recess in a surface of said second strut adjacent the pivotal connection of said first and second strut elements,
  an indicator element pivotally connected within said recess,
  an actuating element movably supported on said second strut and engaging said indicator element for moving the same, said actuating element in the disconnected position of said latch element maintaining said indicator element in a recessed position within said recess, and
  said latch element in said connected position engaging said actuating element displacing said indicator element from said recess to a projecting position,
  said second strut including a second recess, said actuating element being slidably disposed in said second recess and having a position disposed adjacent to said keeper and in the path of movement of said latch element whereby during movement of said latch element to its connected position said actuating element is slidably moved.

2. The invention in accordance with claim 1, said indicator element being pivotally connected within said first recess and having an L-shaped configuration including a finger, said actuating element having an aperture receiving said finger, and
means within said second recess movably biasing said actuating element in a direction toward said latch element.

3. In a trailer hitch having a first strut adapted to be pivotally connected to a railway car for movement from an upright position to a collapsed position, a connecting plate supported by said first strut for attachment to the kingpin of a trailer, a second strut extending diagonally relative to said first strut, said second strut including a first strut element pivotally connected to a railway car, a second strut element pivotally connected to said first strut and to said first strut element, said strut elements in a linear position supporting said first strut and being pivoted in jackknife relation during movement of said first strut to its collapsed position, latching means including a movable latch element on said second strut element, a keeper on said first strut element engaged by said movable latch element to a connected position for retaining said strut elements in said linear position, and means supported on said struts movable upon the application of a longitudinal force for disconnecting said latch element from said keeper to collapse said hitch;

a latch position-indicator arrangement comprising:
  a first recess in a surface of said second strut adjacent the pivotal connection of said first and second strut elements,
  an indicator element pivotally connected within said recess,
  an actuating element movably supported on said second strut and engaging said indicator element for moving the same, said actuating element in the disconnected position of said latch element maintaining said indicator element in a projecting position from said recess, and said latch element in said connected position engaging said actuating element displacing said indicator element from said projecting position to a recessed position within said recess,
  said second strut including a second recess, said actuating element being slidably disposed in said second recess and having a position disposed adjacent to said keeper and in the path of movement of said latch element whereby upon movement of said latch element to its connected position said actuating element is slidably moved.

References Cited

UNITED STATES PATENTS

| | | | |
|---|---|---|---|
| 897,749 | 9/1908 | Krafft | 70—432 |
| 1,252,549 | 1/1918 | Carroll | 70—438 |
| 2,138,856 | 12/1938 | Harp | 70—432 |
| 2,996,021 | 8/1961 | Clejon. | |
| 3,164,346 | 1/1965 | Bateson. | |
| 3,353,505 | 11/1967 | Rollins et al. | |
| 3,357,372 | 12/1967 | Bader | 248—361 |
| 3,358,954 | 12/1967 | Smith et al. | |
| 3,358,955 | 12/1967 | Wille et al. | |

FRANCIS K. ZUGEL, Primary Examiner

U.S. Cl. X.R.

105—368